Dec. 1, 1953     L. H. FRANCIS ET AL     2,661,295
WHEY PRODUCTS AND PROCESS OF MANUFACTURE
Filed Sept. 12, 1950     3 Sheets-Sheet 1
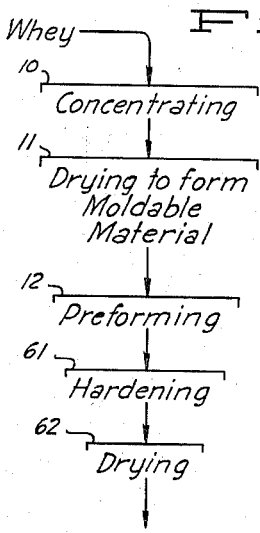
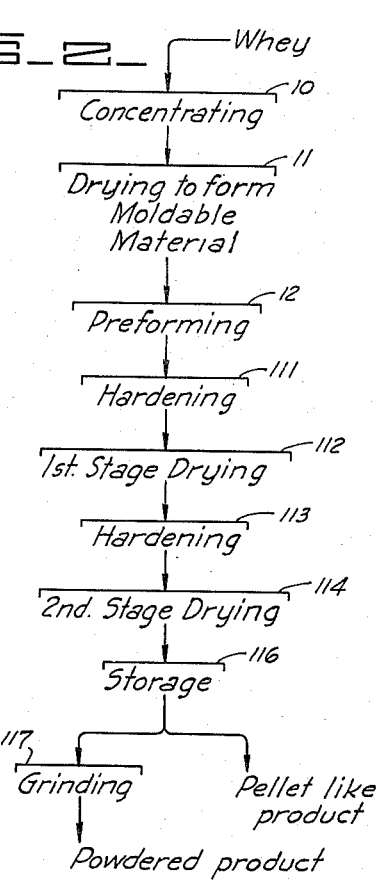
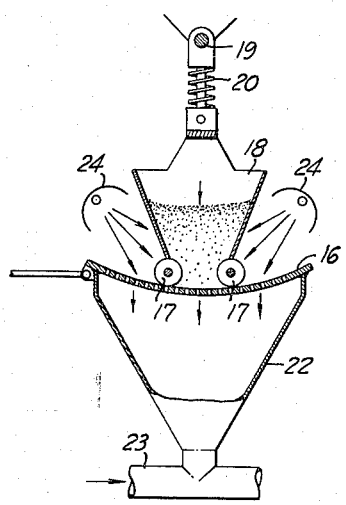
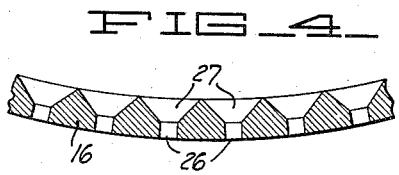
INVENTORS
Leo H. Francis
Nelson E. Rodgers
BY
ATTORNEYS Dec. 1, 1953   L. H. FRANCIS ET AL   2,661,295
WHEY PRODUCTS AND PROCESS OF MANUFACTURE
Filed Sept. 12, 1950   3 Sheets-Sheet 2
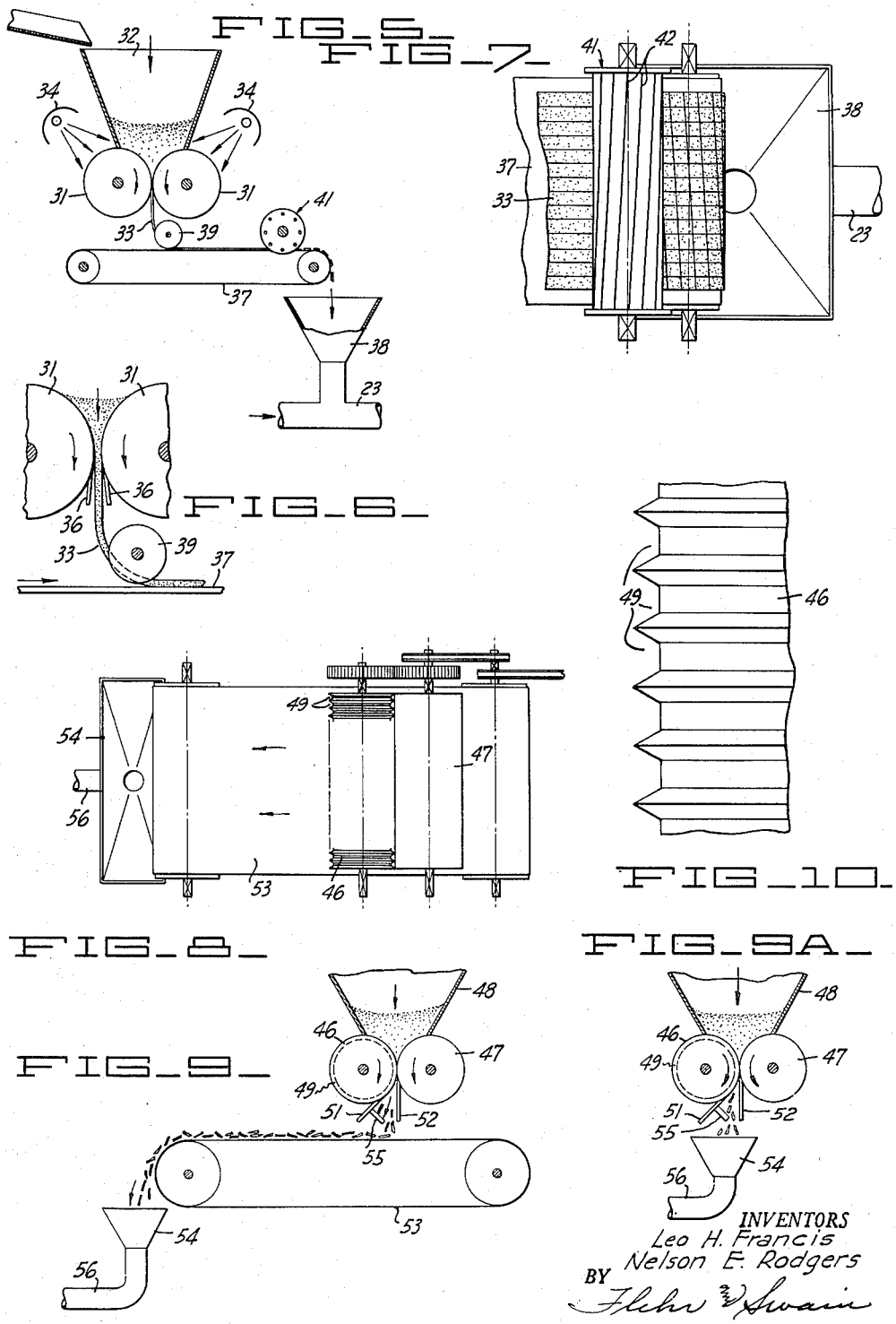

Dec. 1, 1953  L. H. FRANCIS ET AL  2,661,295
WHEY PRODUCTS AND PROCESS OF MANUFACTURE
Filed Sept. 12, 1950  3 Sheets-Sheet 3
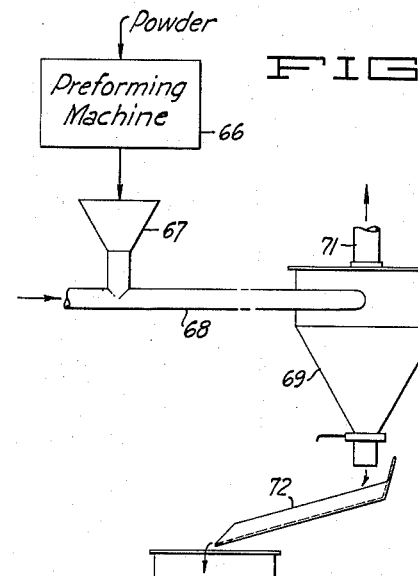
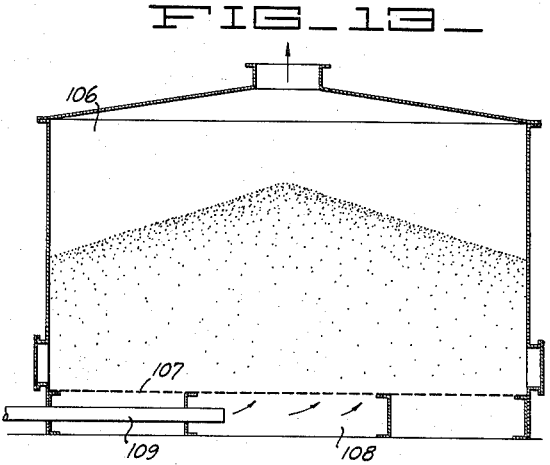
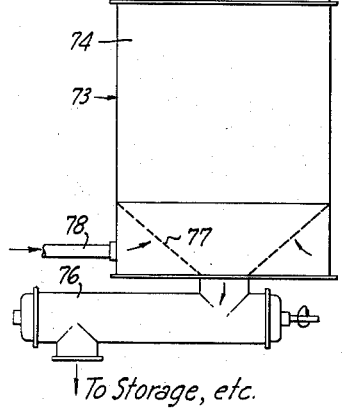
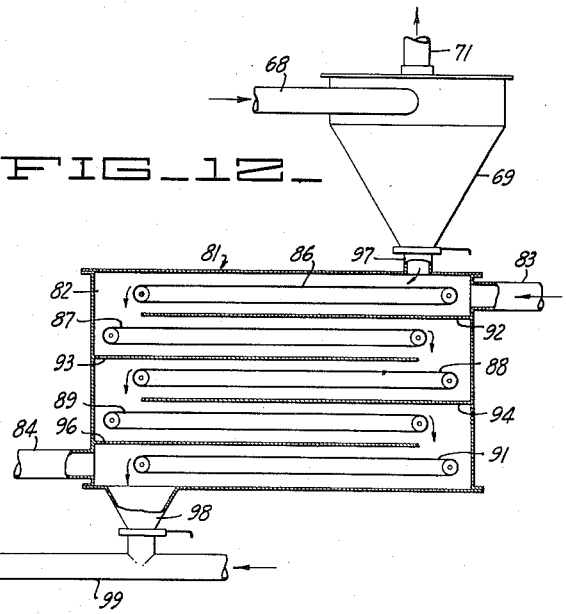
INVENTORS
Leo H. Francis
Nelson E. Rodgers
BY
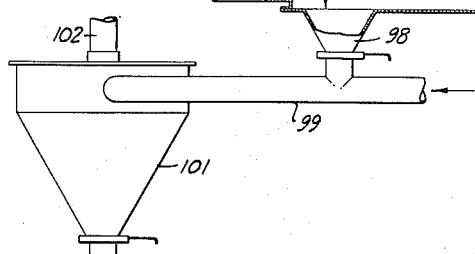
ATTORNEYS Patented Dec. 1, 1953

2,661,295

UNITED STATES PATENT OFFICE 2,661,295

WHEY PRODUCTS AND PROCESS OF MANUFACTURE

Leo H. Francis and Nelson E. Rodgers, Appleton, Wis., assignors to Western Condensing Company, San Francisco, Calif., a corporation of California Application September 12, 1950, Serial No. 184,498

4 Claims. (Cl. 99—57)

This invention relates generally to whey products suitable for use as an animal feed, to processes for manufacture of the same, and to methods for the storage of the finished or semi-finished products.

Commercial whey such as results from the manufacture of cheese and casein is commonly used as a feed for poultry and other livestock. Instead of feeding the whey directly as a raw liquid or liquid concentrate, a considerable part of commercial whey is processed to form a powdered product which is either fed directly or mixed with other food ingredients. Whey powder is manufactured by various processes (see for example Simmons 1,763,633 and Peebles et al. 2,088,606) but in general it is produced in relatively stable nonhygroscopic form, with the lactose content in the form of a monohydrate, to enable it to be marketed in sacks or bags. It is difficult and hazardous to store such powder in bulk, due to continual liberation of heat which may cause development of high temperatures or burning. At elevated temperatures the material tends to develop an objectionable brown color. Furthermore there is a tendency for such a powdered product to fuse and cake.

For certain purposes, as for example for use as a calf feed, it is recognized that powdered whey is not in suitable form for direct use. It has been attempted unsuccessfully in the past to form dried whey into pellets or tablets. Also it has been proposed to mix whey with other ingredients, such as soybean flour, and then pelletize the mixture. However such a mixture necessarily limits the field of application, because only a restricted number of diets are adaptable to such material.

It is an object of the present invention to provide a whey in pellet-like form which may consist entirely or primarily of whey solids, and which is stable and nonhygroscopic.

Another object of the invention is to provide a novel method or process for the manufacture of a pellet-like whey and which process involves a series of relatively inexpensive operations to produce a final nonhygroscopic material which has sufficient hardness to resist crumbling during ordinary handling.

Another object of the invention is to provide a novel method for the storing of dried whey for extended periods of time without serious discoloration, heating or burning, and without caking or fusion into solid masses.

Another object of the invention is to provide a method for the production and marketing of powdered dried whey in stable nonhygroscopic form, and which makes possible bulk storage without discoloration, development of high temperatures or burning.

Additional objects of the invention will appear from the following description in which the preferred embodiments of the invention have been set forth in detail in conjunction with the accompanying drawing.

Referring to the drawing:

Figure 1 is a flow sheet illustrating one procedure for carrying out the present invention.

Figure 2 is another flow sheet illustrating another procedure which can be employed.

Figure 3 is a diagrammatic side elevational view in section illustrating a device for preforming the powdered whey.

Figure 4 is an enlarged detail in section illustrating the forming apertures used in the device of Figure 3.

Figure 5 is a diagrammatic side elevational view partly in section and illustrating another form of apparatus which can be used for the preforming operation.

Figure 6 is an enlarged detail illustrating the manner in which the apparatus of Figure 5 presses the powdered material into a sheet and then cuts the sheet into strips.

Figure 7 is a plan detail illustrating the part of the apparatus shown in Figure 5 which serves to cut the strips into cube-like masses.

Figure 8 is a diagrammatic plan view illustrating another form of apparatus which can be used for the preforming operation.

Figure 9 is a diagrammatic side elevational view of the same apparatus shown in Figure 8.

Figure 9a is a diagrammatic side elevational view of a modification of the apparatus shown in Figures 8 and 9.

Figure 10 is an enlarged detail in section showing the grooves in one of the pressing rolls.

Figure 11 is a diagrammatic side elevational view illustrating a system including apparatus for carrying out the preforming hardening and drying operations.

Figure 12 is a diagrammatic side elevational view partly in section illustrating drying apparatus which can be used where it is desired to employ drying in two stages.

Figure 13 is a diagrammatic side elevational view in section illustrating a storage tank suitable for storing the pellet-like product.

The present invention involves production of a whey powder which, at a suitable moisture content, is supplied to apparatus for preforming the material into pellet-like masses. Thereafter the moisture content of the preformed material is reduced to a value such as from 5 to 8%, total moisture, thus providing a relatively hard pellet-like material which is stable and nonhygroscopic.

Referring first to the simplified flow sheet of Figure 1, we have shown a suitable source of raw liquid whey, such as whey resulting from the manufacture of cheese or casein, being supplied to the concentrating operation 10 where its concentration is increased as by vacuum evaporation to a value of say from 40 to 60% solids. The concentrate is then supplied to the drying operation 11 where it is converted to the form of a moist moldable mass. This drying operation can be carried out, for example, by the use of roll driers, or we may utilize a spray drying method. The material can be produced as a moist powder capable of being pressed or molded into self-sustaining masses.

The material after the drying operation 11 preferably has the bulk of the lactose content in the form of a monohydrate. The drying operation 11 is preferably controlled so that the moisture content (i. e. total moisture) is such that the material lends itself to the subsequent preforming operation. Depending upon certain conditions and factors hereinafter described the moisture content at this point may be within a range of from 6 to 20%. As will be presently explained, the material can be dried to provide a relatively low percentage of total moisture, and then moisture can be added prior to the next stage of the process.

Assuming that the material is spray dried to form moist powder having a total moisture content within a preferred range of from 6 to 10%, it is immediately progressed to the preforming operation 12 which is carried out to form the material into substantially self-sustaining pellets, cubes, or rod-like masses. One type of machine which can be utilized for the preforming operation is manufactured and sold by Welding Engineers Inc., Norristown, Pennsylvania, and employs a worm-type feed which applies pressure to the powder to extrude it through apertures of a die. A continuously agitated cutoff means serves to cut off the extruded material to provide pellets or rod-like masses of substantially uniform length. The size of the masses may vary in practice, depending upon the extrusion die and the adjustment of the machine, but in a typical instance the masses made in this manner may measure about 0.2 inch in diameter and may average about 0.4 inch long. During the operation of the machine described above, it is desirable that the powder being extruded be at an elevated temperature of the order of from 90 to 130° F. Also it is desirable to maintain the extrusion die at a like temperature. Maintenance of such temperatures can be readily accomplished by means of radiant heating or heating by suitable water or steam jackets.

Instead of producing a moist powder for preforming we may employ a paste-like concentrate. For example, either spray drying equipment or roll driers may be controlled to discharge a paste-like concentrate which can be molded or preformed as described above. Also a paste-like concentrate suitable for preforming can be formed by kneading moist whey powder produced by spray or roller drying.

In place of using apparatus of the type described above, pellet or rod-like masses can be formed by using other machines which are capable of extruding or pressing the material into self-supporting masses of suitable size. For example, good results have been secured by using a roller type of extruding machine as shown diagrammatically in Figure 3. This machine consists of a perforated plate 16 over which the presser rolls 17 operate. The rolls 17 are rotatably mounted at the lower end of a feed hopper 18. The hopper together with the rolls 17 is recurrently traversed over the plate 16 to thereby press powder through the plate openings to form relatively self-supporting rod or pellet-like masses.

In the construction illustrated the feed hopper 18 is carried by the pivotal shaft 19 so that it can be oscillated over plate 16. A spring 20 serves to urge the rolls toward plate 16 to provide a desired amount of loading and pressure. The shafts of the rolls 17 are positively driven to insure rolling contact with plate 16, as by means of sprockets or pinions on the ends of the shafts which engage a rack having the same arcuate contour as the plate 16. The material extruded through plate 16 is collected by hopper 22 and can be directed into a pneumatic conveying conduit 23.

It is desirable for best results that the moist powder or paste-like material being treated by the apparatus of Figure 3 be at an elevated temperature of from 90 to 130° F., and it is also desirable that the preforming plate 16, and the rolls 17, be heated to a like temperature. For this purpose suitable heating jackets can be employed for the rolls 17 and for the hopper 18, or as illustrated radiant heating elements 24 can be provided for continually supplying heat to the plate 16, the rolls 17, and side walls of the hopper 18.

The forming holes in the plate 16 can be made substantially as illustrated in Figure 4. Thus the plate in this instance is shown provided with a series of openings 26, which are relatively evenly spaced apart over the area of the plate 16, and the upper portions of these holes are provided with countersunk openings 27. In a typical instance the plate 16 may be about one-half inch thick, with the holes $\frac{7}{16}$ of an inch in diameter, drilled on $\frac{3}{8}$ inch centers, and countersunk $\frac{1}{8}$ of an inch deep. The holes are set sufficiently close whereby the countersunk areas slightly overlap.

In place of the apparatus shown in Figure 3 we can employ apparatus which presses the material into cakes or sheets between pressure exerting rolls, and which subdivides the sheets or cakes into masses of convenient size for further treatment. Such apparatus is illustrated in Figures 5 to 7 inclusive and consists of pressing rolls 31 which are provided with a feed hopper 32, and which serve to form a continuous sheet 33 of compressed material. The rolls 31 and hopper 32 can be suitably heated to an elevated temperature of the order of 90 to 130° F., as by steam jacketing, or by use of the radiant heaters 34. Knives 36 insure discharge of the sheet 33 without adherence to the surfaces of the rolls. The sheet of form material is received on the upper run of the conveyor 37, the discharge end of which is located above the feed hopper 38. This hopper connects with the conduit 23 the same as in Figure 3.

As suitable means for subdividing the form sheet into masses of suitable size for subsequent treatment, we have shown a series of rotary cutting knives 39, which serve to cut the sheet into a series of strips as the material moves downwardly upon the upper run of the conveyor 37. An additional cutting means 41 is provided for cutting the strips crosswise, thus forming cube-like masses of suitable size. The cutting means 41 can be in the form of a rotatable drum (Figure 7) disposed on an axis extending laterally of the conveyor and including a plurality of circumferentially spaced and obliquely disposed cutting wires 42. As the cutting means rotates in conjunction with movement of the conveyor 37, the cutting wires 42 are successively pressed through the strips of material, thus cutting the strips into substantially cube-like masses which then are delivered from the discharge end of the conveyor 37 into the feed hopper 38. By way of example the formed sheet 38 can be say ⅜ of an inch in thickness, and the two cutting means 39 and 41 can serve to cut the sheet into masses of suitable dimensions for subsequent satisfactory drying. In place of the rotary cutting means just described we can employ cutting knives which are vertically reciprocated.

Another type of apparatus which can be used to advantage for the preforming operation, and which is preferable, is illustrated in Figures 8 to 10 inclusive. This apparatus consists of a pair of adjacent pressing rolls 46 and 47, which are associated with the feed hopper 48, and which are rotated in opposite directions the same as in Figure 5. The one roll 46 is provided with a plurality of grooves 49 which can have tapered side walls as illustrated in Figure 10. The rolls are in close apposition whereby when they rotate the material is pressed into the grooves 49. Depending upon the size of the preformed masses desired, these grooves may vary in dimensions from say ¼ inch deep and ⅜ inch wide, to ½ inch deep and ¾ inch wide. The doctor knives 51 are constructed to extend into the grooves 49 and to remove the material pressed therein in the form of sticks which are trapezoidal in cross-sectional contour. The doctor knife 52 can remove any material adhering to the periphery of roll 47.

The sticks of preformed material removed by the doctor knives 51 fall indiscriminately upon the upper run of the endless belt conveyor 53 and are discharged into the hopper 54. As shown in Figure 9a the material can be discharged directly from the rolls to the hopper thus eliminating the conveyor. This hopper is shown connected to the pneumatic conveying conduit 56. As shown, suitable means such as a breaking bar 55 is interposed between the doctor knives 51 and the conveyor belt 53, to break up the sticks of material after their removal from the grooves 49, thus shortening the average length of the masses being delivered to the hopper 54. In a typical instance the masses may have a length ranging from 0.75 to 1.25 inches.

Suitable heating means is preferably employed with the apparatus of Figures 8–10 whereby the hopper 48 and rolls 46, 47 are maintained at an elevated temperature of from 90 to 130° F.

Following formation of the masses by use of one of the machines described above, it is desirable to subject these masses to a hardening operation 61 (Figure 1). This hardening operation is carried out by causing the preformed masses to be cooled to a temperature of the order of 70 to 85° F. One desirable procedure is to pneumatically suspend and convey the formed masses in a stream of cool air, followed by separation of the material for further treatment.

Following the hardening operation 61 the preformed material is preferably subjected to drying at 62 to reduce the moisture content to that desired for the final product. The dried material can then be stored in a manner hereinafter described.

Figure 11 diagrammatically illustrates one form of apparatus which can be used for the hardening and drying operations. Thus a preforming machine 66 is shown operating upon the moist powder or paste-like material to produce the desired pellet-like masses, and the preformed material is then delivered into the hopper 67 which connects with the pneumatic conduit 68. Conduit 68 connects to the inlet side of the cyclone separator 69, the exhaust conduit 71 from which connects the inlet side of a blower. While being conveyed through the conduit 68 and while in suspension within the cyclone separator, the masses are in contact with the cool air. This causes a case hardening effect which is attributed primarily to cooling to a lower temperature, and removal of surface moisture. Such case hardening serves to minimize the tendency of the masses to crumble or to adhere together or to the side walls of the handling equipment. Pneumatic handling in this fashion also serves to round off sharp edges of the masses, which is desirable in that such shaping provides final forms which are less susceptible to crumbling.

From the cyclone separator 69 the material is delivered by conveyor 72 to the drier 73. In this drier the moisture content of the material may be reduced to a value within the range of from 5 to 8%, from 5.0 to 6.0 being optimum. The drier 73 can consist of a tank or container 74 of sufficient size to store a substantial batch of the material. The upper end of the container is open to receive material from the conveyor 72. The lower end of the container is connected to discharge means 76 which serves to deliver the final dried material to suitable sacking means or to a bulk storage tank as will be presently described. The lower part of the container is shown provided with a perforated wall portion 77 through which warm drying air can be introduced by way of conduit 78. The warm air can be at a temperature of the order of from 90 to 170° F. and when delivered continuously through the perforated wall portion 77, this warm air moves upwardly through the mass of material to be discharged from the upper end of the container. Equipment of this type can be operated continuously, with continual introduction of material into the upper end, and continual removal of the dried pellet-like material.

When the preforming operation is carried out on material which has a moisture content near the upper rather than the lower end of the aforementioned moisture range (6 to 20%) it is desirable to employ two stages of drying, with higher drying temperatures being employed in the first stage, and with the second stage drying being carried out in the same manner as described above. Figure 12 illustrates a suitable drier 81 which can be used for such first stage drying. This apparatus consists of a drying chamber 82 provided with inlet and outlet conduits 83 and 84 for circulation of drying gas. A plurality of endless conveyors 86, 87, 88, 89 and 91 are disposed within the drying chamber, and baffles 92, 93, 94 and 96 are interposed between the conveyors. Material is introduced into the drying chamber through the inlet conduit 97, and is deposited upon the first conveyor 86. This conveyor moves the material slowly to the left as viewed in Figure 12 to finally deposit it upon the left hand end of the conveyor 87. Conveyor 87 moves the material slowly to the right to finally deposit it upon the conveyor 88. In this manner the material progresses through the drier to be finally delivered from the conveyor 91 into the discharge hopper 98. The transfer of the material from one conveyor to another also serves to agitate the pellets and prevents their sticking together.

The drying temperatures employed in the apparatus 81 should be sufficiently high to secure relatively efficient removal of a substantial part of the free moisture content, but not sufficiently high to remove water of crystallization of the lactose, or to cause browning or burning. The free moisture remaining after the first stage drying should be at a level suitable for the second drying stage. Thus the inlet air temperature to apparatus 81 may be at an elevated temperature below 180° F. and within a range of say from 130 to 170° F. and the drying time may be such as will reduce the free moisture content to a value which is somewhat greater than that which is desired in the final product. By way of example the inlet air temperature may be about 160° F. with a total drying time of 30 minutes, to reduce the total moisture content from an initial 20%, to 12%.

Assuming use of two drying stages, it is desirable to interpose a cooling and hardening operation. Thus as illustrated in Figure 12 the material from the drier 81 is delivered to the pneumatic conduit 99, which serves to convey it to the cyclone separator 101. The exhaust conduit 102 of this cyclone separator can connect to the inlet side of a suitable blower. Material being conveyed through the conduit 99, and being suspended in the cyclone separator, is contacted with cool atmospheric air to cause a case hardening and cooling effect as previously described. The cyclone 101 can deliver the material to the conveying means 72 (Figure 11) which leads to the secondary drying apparatus.

In both of the drying stages the rate of moisture removal is dependent upon the relative humidity of the drying air, as well as upon such factors as temperature and flow velocity. Thus care should be taken to employ relative humidities such that the free moisture content is reduced to the value desired without undue extension of the drying periods.

Instead of taking the material for preforming directly from a spray drying operation, it has been found possible to intermix water with nonhygroscopic whey powder, and then supply such material to the preforming apparatus. For example the stabilized nonhygroscopic whey powder employed may contain from about 6 to 8% total moisture. Sufficient water is added to such material and thoroughly intermixed, preferably as by vigorous kneading, to produce a total moisture content ranging from about 20 to 25%, the optimum being about 21 to 22%. A minor portion of the lactose content is dissolved in the free moisture. This powder is then heated to a temperature of the order of from 90 to 130° F. and is pressed into preformed masses in the same manner as previously described. Because of the relatively high moisture content of such preformed material, drying of the same should be carried out in two stages as described above.

In place of mixing water with nonhygroscopic stabilized whey powder as described above, we may mix the powder with raw liquid whey or preferably whey concentrate, to produce a moist powder or paste-like material containing from 20 to 25% total moisture, and which is then heated and subjected to the preforming operation. This procedure can be used to advantage when it is desired to manufacture a stable nonhygroscopic whey product from a source of whey concentrate where spray drying facilities are not available, but where one may obtain stabilized whey powder.

In many instances it is desirable to store the dried material in bulk. While various types of storage containers can be employed, suitable apparatus for this purpose is shown in Figure 13. In this instance a tank or storage bin 106 is provided with a lower perforated wall 107 to form a lower ventilating space 108. The space 108 can connect with a source of air such as the air conduit 109. With this type of storage tank, air from the exterior atmosphere, or air which has been suitably conditioned with respect to its temperature and moisture content, may circulate upwardly through the mass of pellets, thus adequately carrying away any heat which is generated, and preventing attainment of such temperatures as might cause spoilage or injury to the material.

The complete procedure described above has been illustrated in the flow sheet of Figure 2. The concentrating, drying and preforming operations 10, 11 and 12 are the same as for Figure 1. Assuming a relatively high moisture content for the preformed material, it is then subjected to the hardening operation 111, the first stage drying 112, hardening 113, and second stage drying 114. The final material is then subjected to storage at 116, as by use of storage means illustrated in Figure 13. The pellet-like product can be taken from storage and marketed as such, or it can be subjected to grinding at 117 to produce a powdered stabilized whey.

During storage of the material as described above care should be taken whereby the relative humidity of the air permitted to circulate through the material is such that no undesirable increase in moisture content occurs. In instances where atmospheric air may vary widely as to relative humidity, it may be necessary to employ suitable air conditioning means to maintain the relative humidity of the circulating air between optimum limits. In this maner the average moisture content of the material undergoing storage may be maintained substantially constant.

Assuming operation of the process upon commercial whey such as is produced as a by-product in the manufacture of cheese, the preferred procedure is to produce a hot powder having a total moisture content ranging from 6 to 10%, in a drying operation 11 carried out by the use of spray drying equipment. This powder, before it has had an oportunity to cool to room temperature is immediately supplied to the preforming operation. In the event that water or liquid concentrate is added to the powder it is desirable to subject it to vigorous kneading to thereby form a mass of dough of paste-like consistency which is immediately supplied to the preforming operation. Such materials when passed through preformer equipment such as illustrated in Figures 8 and 9, tend to set upon the rolls to form hard, tough pellets which are relatively easy to handle without crumbling.

For material having a moisture content ranging from say 10 to 16%, no difficulty is experienced in preforming by use of the apparatus shown in Figures 8 and 9, but the material does not handle as well as material ranging from 6 to 10%, and the percentages of fines is greater. For material (moist powder or paste) ranging from about 16 to 20% moisture, the preforming can likewise be carried out without difficulty, although the masses obtained are relatively wet, and do not have as much strength as the pellets made from powder of lower moisture content.

When our process is employed to treat whey having lower than normal lactose content (e. g. from 50 to 65% lactose monohydrate, dry solids basis) it is desirable to somewhat increase the moisture content of the material. Thus for a low lactose spray dried whey powder containing say 58% lactose (dry solids basis), together with fermentation solubles, the optimum moisture content ranges from 9 to 12%, in contrast with 6 to 10% for the spray dried commercial whey. Such powder tends to become hard and tough as it is preformed, and its "set up" properties are not as well defined as spray dried commercial whey. For a higher moisture content range of from 12 to 16% total moisture, such powder preforms and handles easily but provides an increased amount of fines. Above 16% total moisture the material handles as a wet solid, substantially in the same manner as spray dried commercial whey of the same moisture content.

We have observed that when materials in the low moisture content range are preformed and dried at a relatively rapid rate, the pellets obtained are glass-like in character. We believe that this glass-like state is due to the presence of a mixture of uncrystallized alpha and beta lactose. Such drying can be carried out by use of the apparatus of Figure 12. By way of example, a glass-like material is obtained when pellets originally containing about 8% total moisture are dried by contact with warm air at 160–180° F. to a final total moisture content of 6%, in a period of about 1 hour or less.

Hard glass-like pellets may be desired in certain commercial applications. Pellets produced in this manner will maintain their glass-like nature over long periods of time when stored in contact with air having a relative humidity of the order of 20 to 30% or less. When permitted to contact air at higher relative humidities, the glass-like phase disappears and crystallization takes place.

When it is desired to produce crystalline material rather than pellets of glass-like character, the preformed material is dried relatively slowly, as for example over a period of 8 hours or more at a temperature of the order of 120° F., and by contact with air at say 20 to 30% relative humidity. Under such drying conditions sufficient moisture is available to permit crystallization of the lactose to take place during the drying operation. The product resulting from such treatment is relatively stable and nonhygroscopic.

For most commercial applications we prefer to carry out the preforming operation on whey material which is relatively low in moisture content, as for example from 6 to 10% total moisture, and to carry out one stage drying of the preformed material relatively slowly under moderate conditions of temperature as indicated above, to produce a high quality crystalline product of good color and stability. Such a product should be stored in contact with air within such limits of relative humidity that there is no substantial reabsorption of moisture.

When it is desired to minimize the equipment employed, it is possible to use storage apparatus such as illustrated in Figure 13 for the drying operation. Thus after the material is introduced into this apparatus, the air initially supplied to the conduit 109 can be heated and of a sufficiently low relative humidity to provide the desired drying effect. Thereafter cooler air can be supplied to the conduit 109 during storage.

Previous reference has been made to the desirability of preforming material which has been freshly dried to provide a moisture content within the range desired. In other words we prefer to dispense with any substantial or extended intervening storage between initial drying and the preforming operation. According to our observations, when moist whey powder is removed from a spray drying operation it is not in completely stable condition with respect to its lactose content. A substantial part but not all of the lactose content is in the form of a stable monohydrate. Some further crystallization or other readjustment of the lactose tends to take place for a considerable time after spray drying. Thus immediate preforming of the moist dried material results in formation of masses before such crystallization or readjustment has been completed, and therefore contributes to the hardness and nonfriable nature of the final product.

With respect to maintaining the material during preforming at an elevated temperature, we have found that hot rough dried whey has thermoplastic properties which facilitate preforming in the manner previously described. Preforming at a temperature of from 90° to 130° F., plus proper moisture control, utilizes such properties to advantage.

In the foregoing, particular reference has been made to commercial whey, and to modified whey which may contain lower than normal lactose content. It should be understood that the process is applicable to other modified or fortified whey-like materials. In certain instances it may be desirable to incorporate small amounts of additives such as vitamins and mineral concentrates. Such additives can be intermixed with the whey powder before the preforming operation.

It will be evident from the foregoing that our process can be employed as a general procedure for producing a stabilized monhygroscopic whey powder. Thus the dried pellet-like material can be stored in bulk in the manner described until required for distribution. The material is then ground to a powder of the desired particle size as indicated in Figure 2, to form a stable nonhygroscopic powder which can be marketed in bags or like containers. By the use of this procedure it is possible to avoid the difficulties involved in attempting to store dried whey in powdered form. As previously pointed out when it is attempted to store ordinary stabilized whey powder in bulk, it is subject to burning and discoloration. This is attributed to continual reactions which take place in the powder, and which liberate heat. When stored in bulk the continued generation of heat may ultimately result in attainment of relatively high temperatures and burning of the material. Because of this property it has been difficult if not impossible to store whey powder in considerable quantities over long periods of time. In addition, the powder, even though stabilized, has been subject to some fusion and caking during storage. We have found that our pellet-like whey powder can be stored for long periods of time, either in bags or in bulk, without danger of burning. When stored in bulk, attainment of elevated temperatures can be prevented in the manner described, namely by providing adequate ventilation through the mass of material. Thus under such conditions no part of the bulk mass has an opportunity to attain temperatures such as cause serious injury or discoloration. In addition no fusing or caking takes place.

This application is a continuation-in-part of our copending application Serial No. 116,328 filed September 17, 1949, and entitled "Whey Products and Process of Manufacture."

We claim:

1. In a process for producing pelletized dried whey products without the use of a binder, the steps of drying liquid whey concentrate to form a moist powder containing from about 6 to 10% moisture, pressing the powdered material into pellet-like masses at a temperature from 90 to 130° F., contacting the formed masses with cooling air to effect hardening of the same and reducing the free moisture content by contacting the formed masses with drying air at a temperature on the order of 90 to 170° F.

2. In a process for producing dried whey in pellet-like form without the use of a binder, the steps of concentrating liquid whey to form a moist moldable whey concentrate having a moisture content between about 6 to 25%, pressing the material into pellet-like masses at an elevated temperature of from 90 to 130° F., contacting the formed masses with cooling air at a temperature on the order of 70 to 85° F. to effect hardening of the same, and then subjecting the material to drying by contact with drying air at a temperature on the order of 90 to 170° F. to reduce the free moisture content.

3. In a process for producing pelletized dried whey products without the use of a binder, the steps of drying liquid whey concentrate at an elevated temperature to form a moist powder containing from about 6 to 10% moisture, thereafter and before the powder has had an opportunity to cool to a substantial extent, pressing the powdered material into pellet-like masses while the material is at an elevated temperature of from 90 to 130° F., contacting the formed masses with cooling air to effect hardening of the same, and then reducing the free moisture content by contacting the formed masses with drying air.

4. In a process for producing a product comprising mainly dried whey solids in a pellet-like form, the steps of spray drying liquid whey concentrate to form a moist powder containing from about 6 to 10% moisture, thereafter and before the powder has had an opportunity to cool to a substantial extent, pressing the powdered material into pellet-like masses while the material is at an elevated temperature of from 90 to 130° F., contacting the formed masses with cooling air to effect hardening of the same, and then reducing the free moisture content by contacting the formed masses with drying air.

LEO H. FRANCIS.
NELSON E. RODGERS.

References Cited in the file of this patent

UNITED STATES PATENTS

| Number | Name | Date |
| --- | --- | --- |
| 442,593 | Rehnstrom | Dec. 9, 1890 |
| 1,763,633 | Simmons | June 10, 1930 |
| 1,928,135 | Peebles et al. | Sept. 26, 1933 |
| 2,088,606 | Peebles et al. | Aug. 3, 1937 |
| 2,512,537 | Zellers | June 20, 1950 |